United States Patent
Hager et al.

(10) Patent No.: US 10,057,454 B2
(45) Date of Patent: Aug. 21, 2018

(54) METHOD FOR TRANSMITTING FAX MESSAGES FROM A FAX MESSAGE SENDING DEVICE TO A FAX MESSAGE RECEIVING DEVICE

(71) Applicant: retarus GmbH, Munich (DE)

(72) Inventors: Martin Hager, Munich (DE); Michael Grauvogl, Munich (DE)

(73) Assignee: RETARUS GMBH, Munich (DE)

( * ) Notice: Subject to any disclaimer, the term of this patent is extended or adjusted under 35 U.S.C. 154(b) by 58 days.

(21) Appl. No.: 15/017,757

(22) Filed: Feb. 8, 2016

(65) Prior Publication Data
US 2017/0230534 A1 Aug. 10, 2017

(30) Foreign Application Priority Data
Feb. 5, 2016 (EP) ..................................... 16154402

(51) Int. Cl.
*H04N 1/32* (2006.01)
*H04N 1/00* (2006.01)

(52) U.S. Cl.
CPC ....... *H04N 1/32422* (2013.01); *H04N 1/0022* (2013.01); *H04N 1/00344* (2013.01); *H04N 2201/0093* (2013.01); *H04N 2201/3204* (2013.01)

(58) Field of Classification Search
CPC ..... H04L 41/5019; H04L 45/22; H04L 45/38; H04N 1/00137
USPC ...... 358/1.15, 1.13, 405, 407; 709/232, 238, 709/239
See application file for complete search history.

(56) References Cited

U.S. PATENT DOCUMENTS

| | | | |
|---|---|---|---|
| 5,438,433 A * | 8/1995 | Reifman | H04N 1/00474 358/400 |
| 5,793,498 A * | 8/1998 | Scholl | H04L 51/066 358/434 |
| 2008/0273220 A1 | 11/2008 | Couchman | |
| 2013/0287189 A1 | 10/2013 | Cichielo et al. | |
| 2014/0307294 A1 * | 10/2014 | Rebert | H04N 1/00217 358/407 |
| 2014/0362419 A1 * | 12/2014 | Kamens | H04N 1/2187 358/407 |
| 2015/0092249 A1 * | 4/2015 | Watanabe | H04N 1/00206 358/406 |

(Continued)

OTHER PUBLICATIONS

EP 16 15 4402.8 European Search Report and Opinion dated Jul. 18, 2106.

*Primary Examiner* — Jamares Q Washington
(74) *Attorney, Agent, or Firm* — Arent Fox LLP; Michael Fainberg

(57) ABSTRACT

The disclosure relates to a method of transmitting fax messages from at least one fax message sending device to at least one fax message receiving device. The method is implemented in a fax communication device driver. The method comprises the steps of receiving, from a fax server software module, fax data associated with a fax message to be transmitted from a fax message sending device to a fax message receiving device; deciding, on the basis of at least one predetermined routing rule, whether to route the fax data to the fax communication device or to the cloud provider; and based on a decision result, selectively transmitting the fax data to the fax communication device or to the cloud provider for transmission to the fax message receiving device.

12 Claims, 7 Drawing Sheets

(56) References Cited

U.S. PATENT DOCUMENTS

2015/0373224 A1   12/2015   Kusakabe et al.

* cited by examiner

METHOD FOR TRANSMITTING FAX MESSAGES FROM A FAX MESSAGE SENDING DEVICE TO A FAX MESSAGE RECEIVING DEVICE

CROSS-REFERENCE TO RELATED APPLICATIONS

The present disclosure claims benefit of priority under 35 U.S.C. 119(a)-(d) to a European Application No. 16 154 402.8 filed Feb. 5, 2016, which is incorporated by reference herein.

TECHNICAL FIELD

The present disclosure relates generally to fax messaging. In particular, the disclosure relates to a technique for transmitting fax messages from a fax message sending device to a fax message receiving device.

BACKGROUND

Despite a large variety of web-based messaging solutions (for instance, electronic mail messages, instant messages and so on), faxes or telefaxes (in the following referred to as fax messages) still enjoy continuing support in business. This is because electronic signatures on documents, for instance on contracts, are not yet recognized by law in some countries, while signatures on fax documents are recognized as authentic signatures. Moreover, in some countries faxes are recognized as means of evidence, while e-mails or other electronic messages are not.

A fax message is a telephonic transmission of a scanned printed material (both text and images) to a telephone number connected to a printer or other output device. The original document to be faxed is scanned with a fax machine, which processes the contents (i.e. text or images) as a single fixed graphic image, converting it into a bit map, and then transmitting it to the telephone network in the form of audio-frequency tones. The receiving fax machine interprets the tones and reconstructs the image by printing a paper copy.

Freestanding fax machines working in the above-described manner are more and more replaced by fax servers and other computerized systems capable of communicating (i.e., transmitting and/or receiving) faxes electronically. A fax server is a system installed in a local area network server computer (abbreviated LAN server computer) and configured to provide, according to the client/server model, fax communication (i.e., fax transmission and reception) for one or more computer devices (clients) being attached to the LAN. The fax server may be realized as a separate fax server computer device or as part of a general messaging server computer. Independent of the concrete implementation, the fax server comprises appropriate fax server software for processing the faxes and a fax communication device for communicating the fax messages. The fax communication device can be implemented in the form of one or more dedicated fax boards, fax-capable modems or as software modem emulators using T.38. Such systems have the advantage of reducing costs by eliminating unnecessary print-out and reducing the number of inbound analogue phone lines needed by an office. However, also fax servers are expensive with regard to set-up, maintenance and repair. Moreover, depending on the performance of the fax server, there may exist peak times in which the fax capacity of the server is not sufficient and the fax server is heavily overloaded, whereas for the remaining time the provided fax capacity is not fully used.

In order to provide a more flexible and economic fax messaging solution which better meets the specific demands of customers, remotely hosted fax services (also called cloud fax services) provided by at least one remotely arranged computer device (in the following referred to as cloud fax provider) are nowadays available. Fax services provided by cloud fax providers may comprise Fax-to-Mail services, Mail-to-Fax services and/or web-interface based fax services which enable users to transmit and receive fax messages from their computer devices. Independent of the concrete fax service implementation, the communication between the user computer devices and the cloud fax provider can be simply carried out over the internet, i.e. by using a TCP/IP connection using conventional hardware interfaces. Since the use of cloud fax services makes the use of additional fax software, additional fax hardware, additional phone lines superfluous, the costs for the users can be further reduced. Moreover, in contrast to local fax server solutions, fax messages can be sent or retrieved from anywhere at any time making faxing more convenient.

Due to the above-mentioned advantages of cloud fax services it is expected that local fax server solutions will gradually be replaced by cloud fax services. However, a migration of established fax services from local fax servers to cloud fax providers is time-consuming, and associated with costs and risks because existing fax services cannot easily be migrated to a cloud provider. Moreover, there may be situations in which a local fax service solution is still desirable. However, a mixed operation or a soft migration is difficult to realize because cloud providers and fax servers are too different in terms of how the services are implemented.

Accordingly, there is a need of a more flexible fax communication technique which overcomes the above-mentioned technical disadvantages and other problems in conjunction with fax messaging.

SUMMARY

In order to solve the above-identified technical problem and other problems, according to a first aspect there is provided a method of transmitting fax messages from at least one fax message sending device to at least one fax message receiving device. The method is implemented in a fax communication device driver which is configured to be in communication with a fax communication device of a fax server and a cloud fax provider arranged remote from the fax server on the one hand, and a fax server software module on the other hand. The method comprises the steps of: receiving, from the fax server software module, fax data associated with a fax message to be transmitted from a fax message sending device to a fax message receiving device; deciding, on the basis of at least one predetermined routing rule, whether to route the fax data to the fax transmission module or to the cloud provider; and based on a decision result, selectively routing the fax data to the fax communication device or to the cloud fax provider for transmission to the fax message receiving device.

The at least one fax message sending device may be a client computer device which may be in communication with the fax server over a local area network. The at least one fax message sending device may be a fixedly installed computer device (e.g. a personal computer) or a portable computer device (e.g., a notebook, smartphone) or any other electronic device from which a fax transmission job can be started. The fax transmission job may be processed by the fax server, which may generate a fax message and transmit it via the cloud fax provider or the fax communication device to the fax message receiving device.

The at least one fax message receiving device may be a fax machine or a computer device (such as a personal computer, notebook, smartphone) configured to receive the transmitted fax message. The at least one fax message receiving device may be arranged outside the local area network, to which the at least one message receiving device and the fax server are attached.

The fax data received from the fax server software module may comprise fax metadata and fax image data. The fax metadata may comprise at least one of the following parameters: sending device identifier (TSID), receiving device identifier (CSID), fax number of the receiving device, fax number of the sending device, a priority level of a fax message to be transmitted, a security level of a fax message, and other processing parameters of the fax message to be transmitted. The fax image data may represent document data (i.e., the content of a document) to be transmitted as fax message in the form of a graphical image according to a predetermined image format specified by a predetermined fax standard.

The deciding step may comprise: comparing fax metadata comprised by the received fax data with the at least one predetermined routing rule; and based on a comparison result, deciding whether to route the fax data to the fax communication device or to the cloud provider.

The at least one predetermined routing rule may define whether to route the fax to the cloud fax provider or to the fax communication device of the fax server in dependence of at least one fax data parameter and fax transmission parameter. The at least one fax data parameter may comprise at least one of the following parameters derivable from the fax metadata: sending device identifier (e.g., TSID), receiving device identifier (e.g., CSID), fax number of the message receiving device, fax number of the message sending device, priority level of a fax message to be transmitted, security level of a fax message to be transmitted, and at least one processing parameter indicative of a processing type (processing mode) of the fax message to be transmitted. The security level parameter may be indicative of a confidentiality level of a fax message. The priority level parameter may be indicative of the urgency of a fax message. The at least one processing parameter may be indicative of how the fax message should be further processed. For instance, the at least one processing parameter may define whether the fax message shall be provided with a digital signature, a qualified time stamp, archived at the cloud fax provider, and so on.

The fax transmission parameter may be indicative of the current transmission load of the fax communication device. In case the fax communication device is overloaded, it may be decided by the communication device driver to route all outgoing fax messages to the cloud fax provider.

According to one variant the deciding step may be performed on the basis of a fax number and/or identifier of the message sending device. In case the fax number and/or identifier of the message sending device has been found to correspond to a predetermined fax number and/or identifier, the fax messages are routed to the cloud fax provider. Alternatively, in case the fax number and/or identifier of the message receiving device has been found to correspond to a predetermined fax number and/or identifier, the fax messages are routed to the cloud fax provider.

The routing step may comprise: establishing (by the fax communication device driver) a connection with the fax communication device and routing the fax image data to the fax communication device, if it has been decided to transmit the fax message via the fax communication device to the message receiving device. Additionally or alternatively, the transmitting step may comprise establishing (by the fax communication device driver and via a network card) a connection with the cloud fax provider and routing the fax data to the cloud fax provider, if it has been decided to transmit the fax message via the cloud fax provider to the message receiving device.

The method may further comprise receiving (by the fax communication device driver) a final transmission status from the fax communication device or the cloud fax provider after the fax message has been transmitted to the message receiving device; and returning the final transmission status to the fax server software module. The final transmission status may be provided by the fax communication device of the fax server or cloud fax provider after the fax transmission job has been carried out (that is, no further connection attempts to the message receiving device are performed). The final transmission status may be indicative of a fax message transmission state, i.e., whether the fax message transmission was successful or not (for instance, due to connection failure).

According to one variant an established connection between the cloud fax provider and the fax communication device driver may be kept open until the final transmission status has been received from the cloud fax provider. According to an alternative implementation the established connection between the cloud fax provider and the fax communication device driver is closed after the fax data has been routed to the cloud fax provider. In this case the method may further comprise polling (by the fax communication device driver) the final transmission status until the final transmission status is returned from the cloud fax provider or a connection timeout is reached. The polling may be retried several times until the predetermined connection timeout is reached or the final transmission status has been communicated by the fax cloud provider.

According to a further aspect a fax communication device driver is provided, which is deployed on a fax server, wherein the fax communication device driver is configured to be in communication with a fax communication device of the fax server and a cloud provider arranged remote from the fax server on the one hand, and a fax server software module on the other hand, wherein the fax communication device driver is further configured to: receive, from the fax server software module, fax data associated with a fax message to be transmitted from the fax message sending device to the fax message receiving device; decide, on the basis of at least one predetermined routing rule, whether to route the fax data to the fax communication device or to the cloud provider; and based on a decision result, selectively route the fax data to the fax communication device or to the cloud provider.

The fax communication device driver is implemented as software module comprising a set of program instructions (program code) for carrying out the above described method when executed by (a processor of) the fax server.

According to still another aspect a fax server for transmitting fax messages from at least one fax message sending device to at least one fax message receiving device is provided. The fax server is in communication with at least one fax message sending device over a local area network, and comprises: a fax server software module configured to generate fax data based on document data to be transmitted as fax message, a fax communication device, and the above-described fax communication device driver, wherein the fax communication device is configured to transmit the fax data received from the communication device driver to the message receiving device. The fax server software module comprises a set of program instructions (program code) for carrying out the functionalities described herein when executed by (a processor of) the fax server.

The generation of fax data by the fax server software module may comprise converting (and compressing) document data to be transmitted as fax message into an image according to at least one predetermined fax standard. The document data to be converted by the fax server software module may be provided in an arbitrary data format (image and/or text data format) or may be provided in a predetermined data format accepted by the fax server software module.

The fax server software module may be further configured to receive metadata and document data from the message sending device. In case the document data required for a fax message are already stored on the fax server, the fax server software module may be configured to select the appropriate document data upon receiving a corresponding fax transmission request from the fax message sending device. Further, the fax server software module may be configured to transmit the generated image data and metadata to the fax communication device driver.

The fax communication device may be configured to establish, on the basis of received fax metadata, a connection to the at least one message receiving device via a public switched telephone network, or PSTN. Further, the fax communication device may be configured to transmit image data received from the fax server software module over the established connection.

The fax communication device may be implemented in the form of at least one of a hardware module and software module. As hardware module the fax communication device can be implemented in the form of one or more dedicated fax boards or fax-capable modems. As software module the fax communication device may be implemented as software modem emulators using T.38 or other methods implemented in software, like G.711 Voice streams created by a software or hardware DSP, for fax transmission according to ITU standards. Still other methods may involve http streams for transmitting fax data.

BRIEF DESCRIPTION OF THE DRAWINGS

Further details, aspects and advantages of the present disclosure described herein will become apparent from the following drawings, in which.

DETAILED DESCRIPTION

In the following description, for purposes of explanation and not limitation, specific details are set forth in order to provide for a thorough understanding of the technique presented herein. It will be apparent to one skilled in the art that the disclosed technique may be practised in other embodiments that depart from these specific details.

Figure 1:
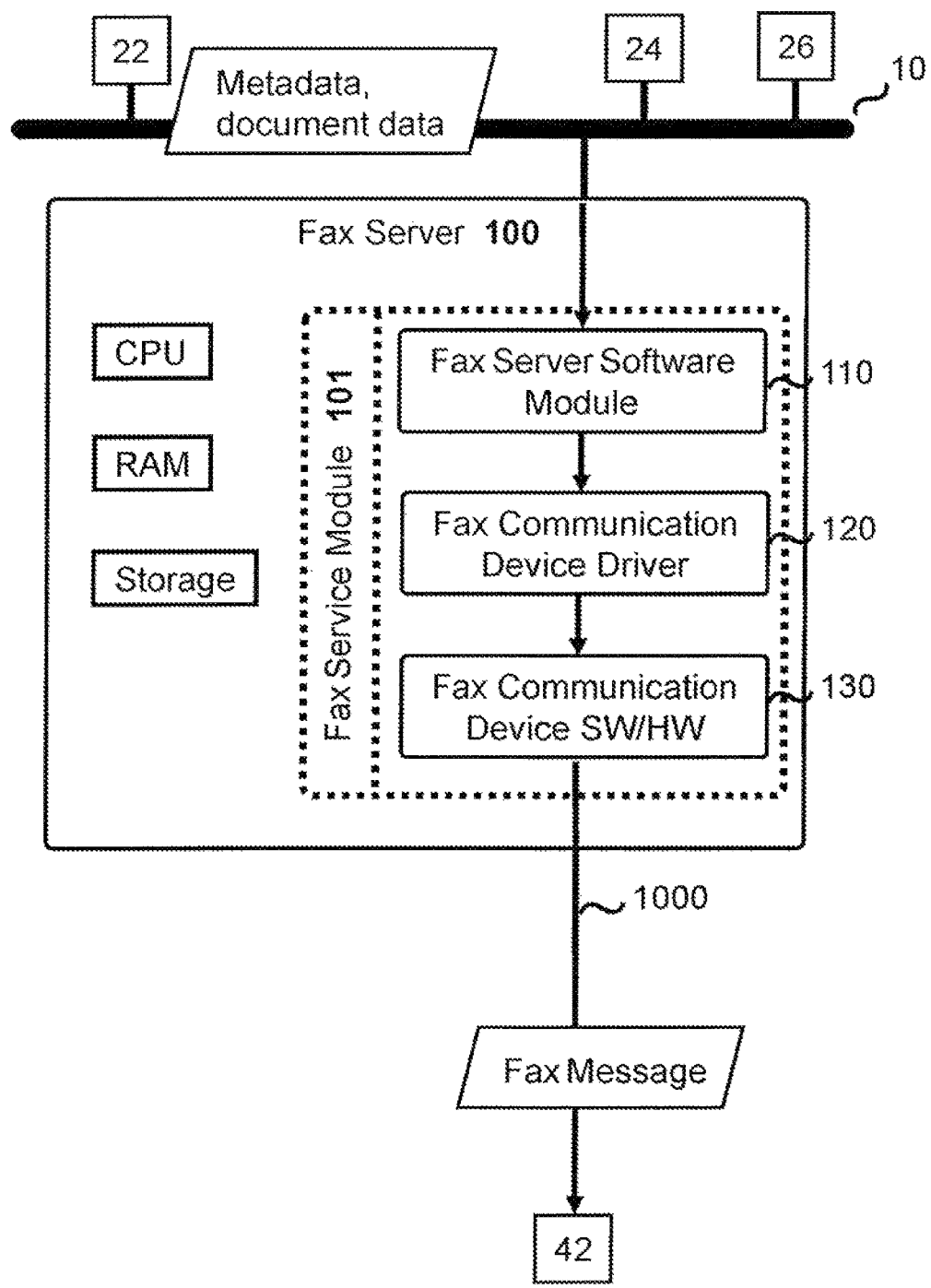
FIG. 1 is a block diagram illustrating a conventional fax communication technique involving a fax server.

With reference to FIG. 1 a fax communication technique is described which involves a conventional fax server 100. As illustrated in FIG. 1, the fax server 100 is in communication with one or more computer devices 22, 24, 26 (clients; in the following referred to as fax message sending devices 22, 24, 26) over a local area network 10 (LAN). Moreover the fax server 100 is connected to a public switched telephone network 1000, or PSTN. The local area network 10 may be a corporate network, private network or any other local network. The one or more fax message sending devices 22, 24, 26 may be implemented in the form of fixedly installed computer devices or portable user terminals (such as notebooks, PDAs, smartphones or other terminals).

The fax server 100 is configured to establish a fax connection to a fax machine or computer device (referred to as fax message receiving device 42 hereinafter) over the telephone network 1000. Following the client-server principle, the fax server 100 acts as local fax service provider configured to allow users of the user computer devices 22, 24, 26 to send and receive fax messages to the fax message receiving device 42. Hence, the fax server 100 represents a local (or in-house) system which is designed to process fax jobs (i.e., fax message sending and/or fax message receiving jobs) received from the one or more fax message sending devices 22, 24, 26 in a local, centralized way.

Still with reference to FIG. 1, the structure and functionalities of the fax server 100 are further described. The fax server 100 comprises a fax service module 101 comprising a fax server software module 110, a fax communication device driver 120 and a fax communication device 130. The fax server 100 further comprises a processor (e.g. a central processing unit, or CPU), a random access memory (RAM), a storage and at least one communication interface (not shown in FIG. 1), which are in communication with each other and the fax service module 100a. In FIG. 1, the fax server 100 represents a separate server computer attached to the local area network 10. Alternatively, it is also conceivable that the components of the fax service module 100a (i.e., fax server software module 110, fax communication device driver 120 and fax communication device 130) are installed on a general server computer providing different messaging services to the fax message sending devices 22, 24, 26.

The at least one communication interface is configured to establish a bi-directional communication between the one or more fax message sending devices 22, 24, 26 on the one hand, and the fax server software module 110 on the other hand. The communication interface may be implemented as hardware interface or software interface (e.g., a high level API) or a combination of hardware and software interface. As hardware interface a wireless communication interface and/or a wired communication interface may be used.

The CPU is configured to process program instructions of the server software module 110 and/or the fax communication driver 120. Further, the CPU is configured to process fax data.

The RAM is configured to cache the program instructions (and other data associated with fax messages) to be processed by the CPU. The storage is configured to store fax data or any type of data associated with fax messages.

The fax server software module 110 is configured to receive, via network 10 and the at least one communication interface, metadata and document data to be sent as fax message from the at least one fax message sending devices 22, 24, 26. The document data represents the content of the document to be faxed. The document data can be provided in an arbitrary document format or in a format desired by the fax server fax (for instance, in pdf-format). The fax server module 110 is further configured to convert the document data in the form of a graphical image according to a predetermined image format specified by a predetermined fax standard. In order to implement these functionalities the fax server software module 110 comprises a set of program instructions (program code) which perform the above described data processing steps, when executed by the processor of the fax server 100.

The fax communication device 130 is attached to the PSTN 1000. The fax communication device 130 is configured to establish a fax connection to the message receiving device 42. The fax communication device 130 is further configured to transmit fax messages over the established fax connection to the fax message receiving device 42. The fax connection is established over the telephone network 100. Although not explicitly illustrated in FIG. 1, it is clear that depending on the number of phone lines available to the fax communication device 130, the fax communication device 130 can establish a plurality of fax connections in parallel. The fax communication device 130 can be implemented in the form of at least one of a hardware module and a software module. Being implemented as hardware module, the communication device may comprise at least one dedicated faxboard or one or more fax-capable modems. Being implemented as software module the communication device 130 may be designed to support T.38 or any other transmission method implemented in software, like G.711 Voice streams created by a software or hardware DSP (digital signal processor), for realizing Fax over IP.

The fax server software module 110 on the one hand, and the fax communication device 130 on the other hand, represent two separate entities which usually are provided by different suppliers. In order to enable an appropriate communication between both modules 110, 130, a fax communication device driver 120 is arranged in the communication path between the fax server module 110 and the fax communication device 130. The fax driver module 120 is designed as software module comprising one or more software routines which are designed to operate or control the fax communication device 130 in response to corresponding requests or commands received from the fax server software module 110. In other words, the fax driver module 120 represents a software interface to the fax driver module 120, enabling the fax server software module 110 to access the fax communication device 130.

In the following the operation of the fax server 100 is briefly described in conjunction with a fax message transmitting job. Only for the purpose of explanation it is assumed that a fax message transmission to the message receiving device 42 is commissioned by a user of the fax message sending device 22. It is obvious that the fax server operation does not depend on from which message sending device 22, 24, 26 the fax message transmitting job is commissioned.

In a first instance, a user of the fax message sending device 22 determines which document data should be sent as fax message and to which fax message receiving device 42 the fax message should be transmitted. The fax message receiving device 42 is selected by specifying a corresponding fax number associated with the message receiving device 22. Moreover the user can specify other fax message related parameters, such as a priority level of the fax message, a security level of the fax message and so on (in the following referred to as metadata of the fax message). Thereafter, the computer device 22 generates a corresponding fax message transmitting job and hands over the document data and metadata to the fax server 100 for further data processing.

The document data and metadata received from the fax message sending device 22 are converted by the fax server software module 110 according to a predetermined fax message standard. That is, the document data are converted into fax image data according to the used fax standard. The so generated fax message is routed via the fax communication device driver 120 to the fax communication device 130. The fax communication device 130 establishes, in dependence of the received fax metadata, an appropriate fax connection to the fax message receiving device 42. Further, the fax communication device 130 transmits the fax message over the telephone network 1000 to the fax message receiving device 42.

Figure 2:
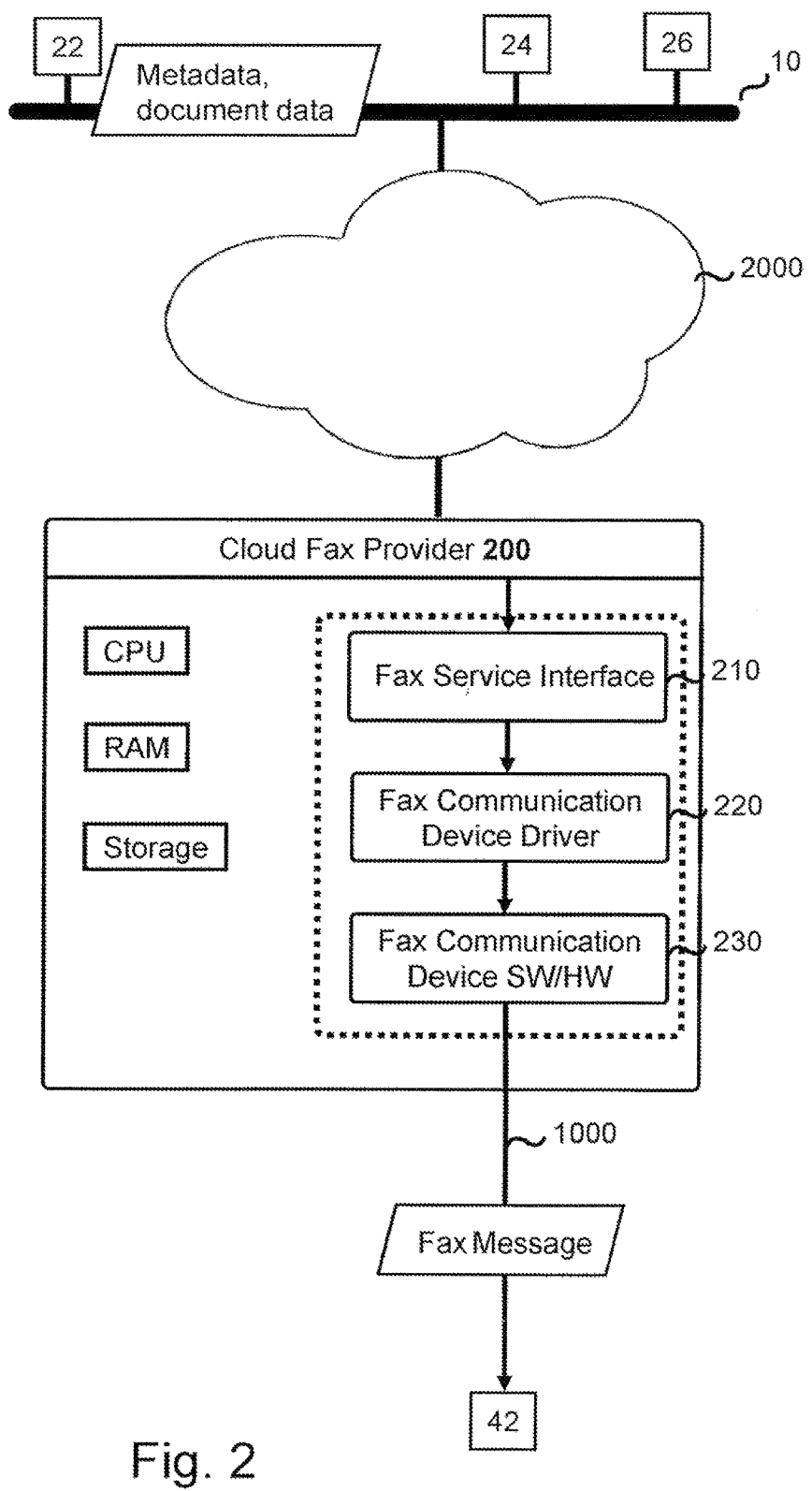
FIG. 2 is a block diagram illustrating another conventional fax communication technique involving a cloud fax provider.

With reference to FIG. 2, an alternative way of communicating (i.e. receiving and transmitting) fax messages between the fax message sending devices 22, 24, 26 and the fax message receiving device 42 is described. In contrast to the server configuration illustrated in FIG. 1, the fax message sending devices 22, 24, 26 use a cloud fax provider 200 for transmitting (and also receiving) fax messages to (or from) the fax message receiving device 42. The cloud fax provider 200 is arranged remotely from the fax message sending devices 22, 24, 26 or the local computer network 10, to which the fax message sending devices 22, 24, 26 are attached. Further, the communication between the fax message sending devices 22, 24, 26 and the cloud fax provider 200 is performed through a cloud 2000 (i.e., through a global TCP/IP data network).

As illustrated in FIG. 2, the cloud fax provider 200 comprises a fax service interface 210, a fax communication device driver 220 and a fax communication device 230. Moreover, the cloud fax provider 200 comprises a communication interface (not illustrated in FIG. 2) for communicating with the cloud 2000, a processor (e.g., a central processing unit, or CPU) for processing data associated with fax messages, a random access memory (RAM) for caching the data to be processed and a storage for storing the processed data. CPU, RAM, storage, and fax service interface are in communication with each other for continuous data exchange.

The service interface 210 is configured to generate, on the basis of metadata and document data received from the message sending devices 22, 24, 26 via the network 2000, fax data (fax messages) according to a predetermined fax message standard. The service interface 210 is further configured to route the generated fax data via the fax communication device driver 220 to the fax communication device 130 for transmission. Additionally, the service interface 210 may be designed to further process the fax data by, for instance, generating and providing an electronic signature and/or a time stamp to the fax message. Moreover, the service interface 210 may be designed to archive the transmitted fax messages in the storage of the cloud fax provider 200. The service interface 210 is implemented as software module implementing the above described functionalities, wherein the software module comprises a set of program instructions, which (while being executed) transform the processor in a special-purpose device.

The fax communication device 230 and the fax communication device driver 220 correspond structurally and functionally to the respective fax communication device 130 and the fax communication device driver 120 of the fax server 100. For further implementation details reference is made to the corresponding description of the fax communication device 130 and fax communication device driver 120 of the fax server 100 in conjunction with FIG. 1 above.

It is noted that one of the main differences between the fax server 100 illustrated in FIG. 1 and the cloud fax provider 200 of FIG. 2 is that the cloud fax provider 200 is arranged in the cloud 2000, whereas the fax server 100 represents a local solution which is only accessible via the local network 10.

Figure 3:
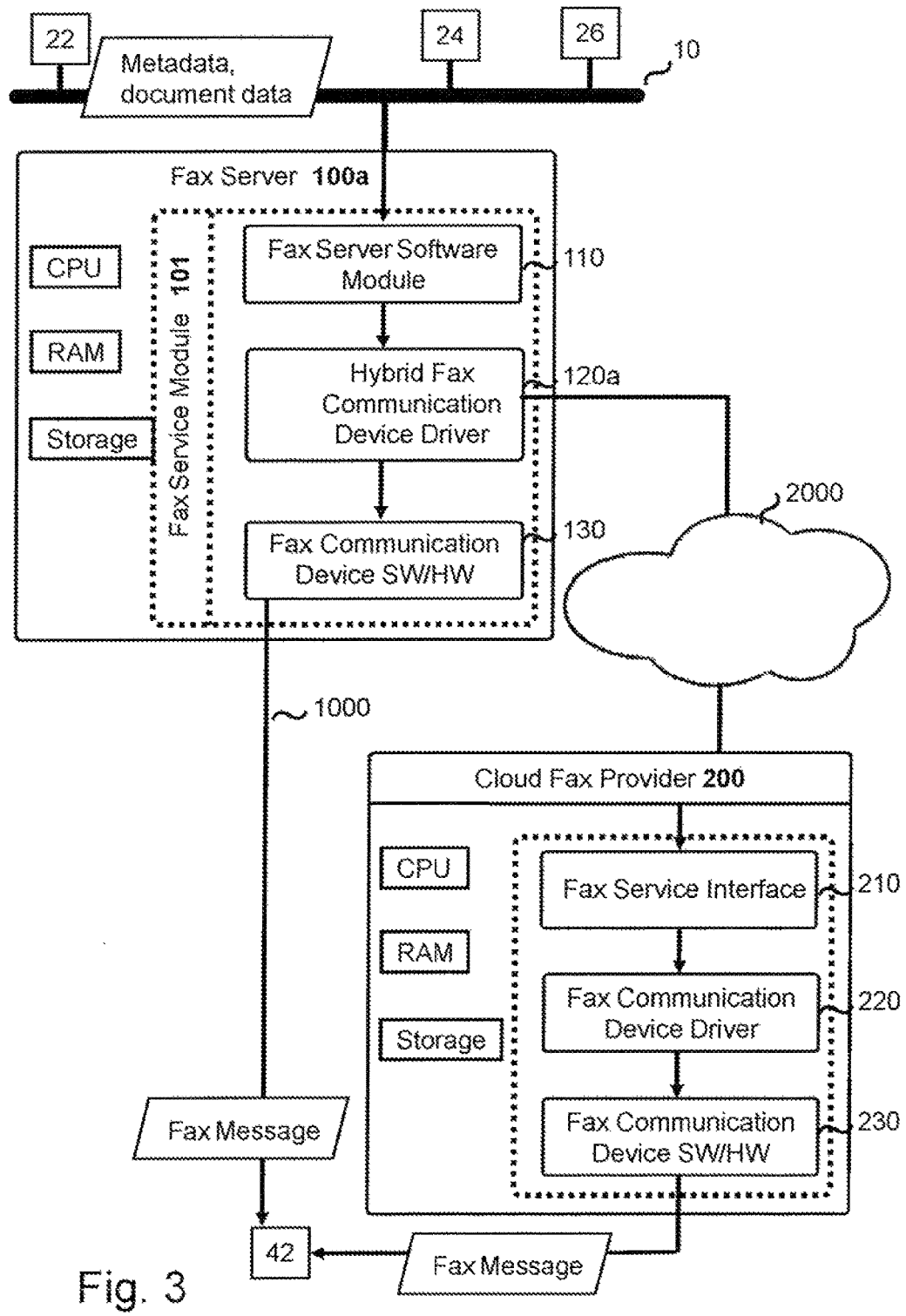
FIG. 3 is a block diagram illustrating a fax communication technique involving a fax server and a cloud fax provider according to the invention.

With reference to FIG. 3 a fax communication technique according to the present invention is described. More specifically, a fax transmission technique is described which involves a local fax server 100a and a remotely arranged cloud fax provider 200. The cloud fax provider 200 of FIG. 3 substantially corresponds to the cloud fax provider 200 of FIG. 2 and is therefore denoted by the same reference sign. Regarding the structural setup and operation of the cloud fax provider 200 reference is made to the description of FIG. 2 above.

The fax server 100a differs from the fax server 100 of FIG. 1 in the fax communication device driver 120 (referred to as hybrid fax communication device driver 120a hereinafter) arranged in the communication path between the fax server software module 110 and the fax communication device 130. All other components of the fax server 100a correspond to the corresponding components of the fax server 100 and are denoted by the same reference signs. Regarding the structural and functional properties of the fax server software module 110 and the fax communication device 130 as well as their operation in conjunction with transmitting fax messages, reference is made to FIG. 1 and the corresponding text passages above.

As illustrated in FIG. 3, the hybrid fax communication device driver 120a differs from the fax hardware driver 120 of FIG. 1 in that the hybrid fax communication device driver 120a is configured to communicate with the fax communication device 130 and the cloud fax provider 200. The communication with the cloud fax provider 200 may be established via a TCP/IP communications interface (e.g. via a network card) of the fax server 100a (not shown in FIG. 3). Hence, in contrast to the fax hardware driver 120 of FIG. 1, the hybrid fax communication device driver 120a is not only configured to route fax data (or fax messages) to the fax communication device 130, but also to the cloud fax provider 200 for transmitting the messages to the message receiving device 42. That is, the hybrid fax communication device driver 120a is configured to realize two different (i.e., distinct from each other) messaging paths for transmitting fax messages to the message receiving device 42.

The hybrid fax communication device driver 120a is a software module which is fully compatible with the fax server software module 110. That is, the fax server software module 110 can communicate with the hybrid fax communication device driver 120a in the same way as with the fax hardware driver 120 of FIG. 1. However, compared to the conventional fax communication device driver 120, the hybrid fax communication device driver 120a comprises additional program instructions, which, when executed by the processor of the fax server 100a, enable a transmission of fax data (or a fax message) to the message receiving device 42 over two different transmission paths.

Figure 4:
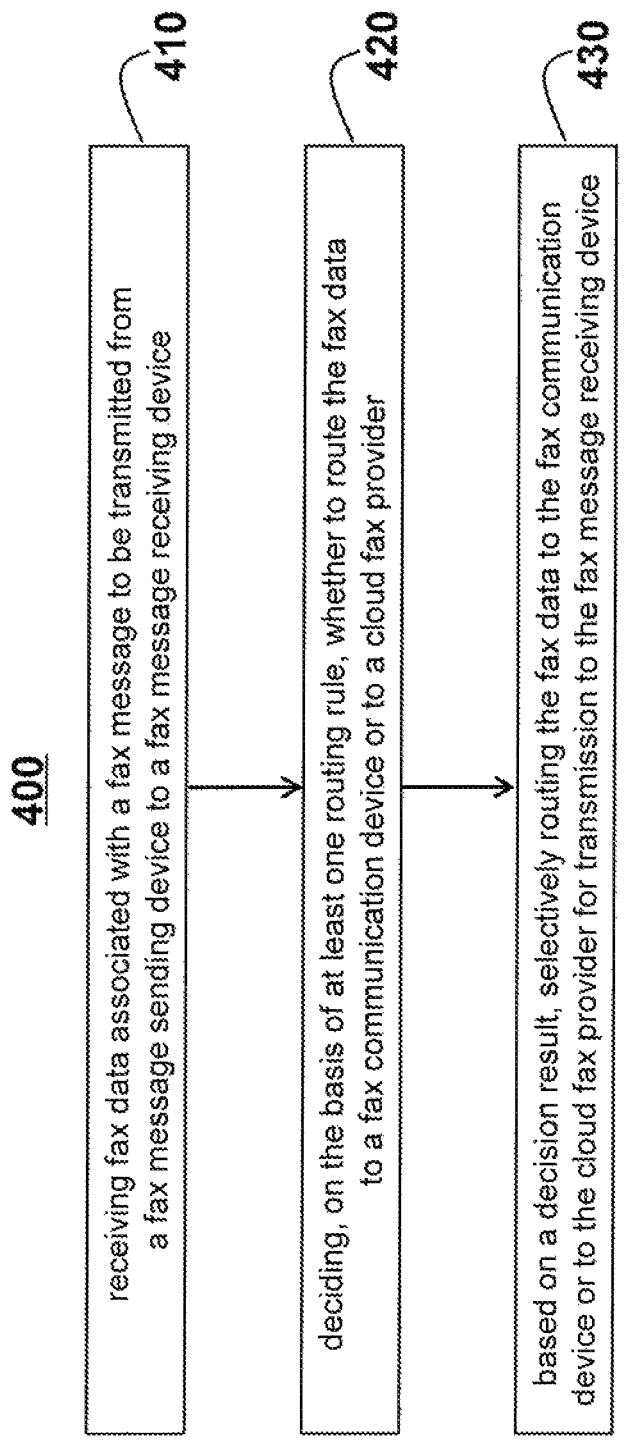
FIG. 4 is a flow diagram illustrating a method of communicating fax messages according to the invention.

With reference to FIG. 4 the additional functionalities of the hybrid fax communication device driver 120a are further described. FIG. 4 shows a flow diagram 400 illustrating a method of transmitting fax messages from at least one message sending device 22, 24, 26 (for instance, from the message sending device 22 as illustrated in FIG. 3) to the message receiving device 42. As mentioned above, the method is implemented by the hybrid fax communication device driver 120a, which is in communication with the fax server software module 110 on the one hand and the fax communication device 130 and the fax cloud provider 200 on the other hand.

The method starts with step 410 in FIG. 4, according to which the hybrid fax communication device driver 120a receives from the fax server software module 110 fax data associated with a fax message to be transmitted to the selected fax message receiving device 42. The fax data provided by the fax server software module 110 comprise metadata and converted image data of the document to be transmitted. The conversion of document data received from the message sending device 22 and generation of image data according to a predetermined fax standard (e.g. T.30 or T.38) is already performed by the fax server software module 110.

The metadata may comprise at least one of a sending device identifier (TSID), receiving device identifier (CSID), fax number of the receiving device, fax number of the sending device, a priority level of a fax message to be transmitted, a security level of a fax message, and other processing parameters of the fax message to be transmitted. The security level may be indicative of a confidentiality level of the fax message. The priority level may be indicative of the urgency of a fax message. Both the level of priority and the level of security may be expressed in form of boolean variables (e.g., "high", "low", "medium" or "+1", "0", "−1"). The other processing parameters may comprise parameters, such as whether the fax message to be transmitted shall be provided with a digital signature, a qualified time stamp and so on.

In a subsequent method step 420 the hybrid fax communication device driver 120a decides, on the basis of at least one routing rule, whether to route the fax data to the fax communication device 130 or to the cloud fax provider 200. More specifically, the decision may be performed on the basis of the above described metadata associated with the fax message and at least one predetermined routing rule. The metadata (or parameter values derivable therefrom) are compared with the at least one predetermined routing rule. Based on the comparison result, it is decided, by the hybrid hardware driver 120a, to route the fax data to the fax communication device 130 or to the cloud fax provider 200.

The predetermined routing rules may be pre-defined by a user or an administrator. The predetermined routing rules define certain routing conditions (or routing policies), under which fax messages are to be transmitted over the respective fax communication device 130 or the cloud fax provider 200. For instance, a routing rule may define that fax messages to be transmitted abroad (i.e., in a country different from the country where the fax server 100a resides) or fax messages to be transmitted to message receiving devices located in specific countries or regions shall be preferably routed by the hybrid fax communication device driver 120a to the fax cloud provider 200. Whether a specific fax message has to be transmitted abroad or to a specific country or region can be easily derived from the fax number of the fax message receiving device comprised in the fax message metadata.

Another routing rule may define that fax messages are to be transmitted over the cloud fax provider 200, if the metadata of the fax message indicate a certain priority level and/or certain security level. For instance, it is conceivable that fax messages having a high or medium priority level and/or a high or medium security level are routed to the fax cloud provider 200, while fax messages having a low priority level and/or low security level are routed to the transmission device 130 or vice versa. Still another routing rule may define that fax messages requiring certain fax message services or requiring a certain fax message processing (e.g., archiving the messages; providing fax transmission report via e-mail; providing a digital signature for the fax message and/or qualified time stamp, Fax-to-Mail processing, and so on) shall be routed, by the hybrid fax driver module 120*a*, to the fax cloud provider 200 providing these services. It is conceivable that the decision of the hybrid fax driver 120*a* is based on at least one of the aforementioned routing rules.

Additionally or alternatively to the above described routing rules taking into consideration specific fax data parameters comprised in the fax metadata parameters of the fax message to be transmitted, the routing decision of the hybrid fax driver 120*a* may be based on at least one transmission parameter indicative of the current transmission state of the fax communication device 130 and/or the cloud fax provider 200. For instance, the routing rule may specify that all fax messages shall be temporarily routed to the cloud fax provider 200 if the hybrid fax communication device driver 120*a* recognizes that the fax communication device 130 does not work properly or is temporarily overloaded. This decision to route to the cloud fax provider 200 in the case of overload of the fax communication device 130 may be made, by the hybrid fax communication device driver 120*a*, independent from other routing rules which, for instance, take into consideration specific fax data parameters. In a similar way, the hybrid fax communication device driver 120*a* may decide to temporarily route all fax messages to the fax communication device 130 for the time, for which the connection to the cloud fax server 200 is interrupted. Thus, the hybrid fax communication device driver 120*a* can dynamically use one of the two messaging paths as transmission backup, if the other one of the two messaging paths is interrupted or blocked. Moreover, the hybrid fax communication device driver 120*a* can dynamically use the two messaging paths for better distributing the fax transmission load.

In a subsequent third step 430, the hybrid fax communication device driver 120*a* routes, based on the above described decision, the fax data to the fax transmission device 130 of the local server 100 or to the remote cloud fax provider 200 for transmission to the fax message receiving device 42.

Figure 5A:
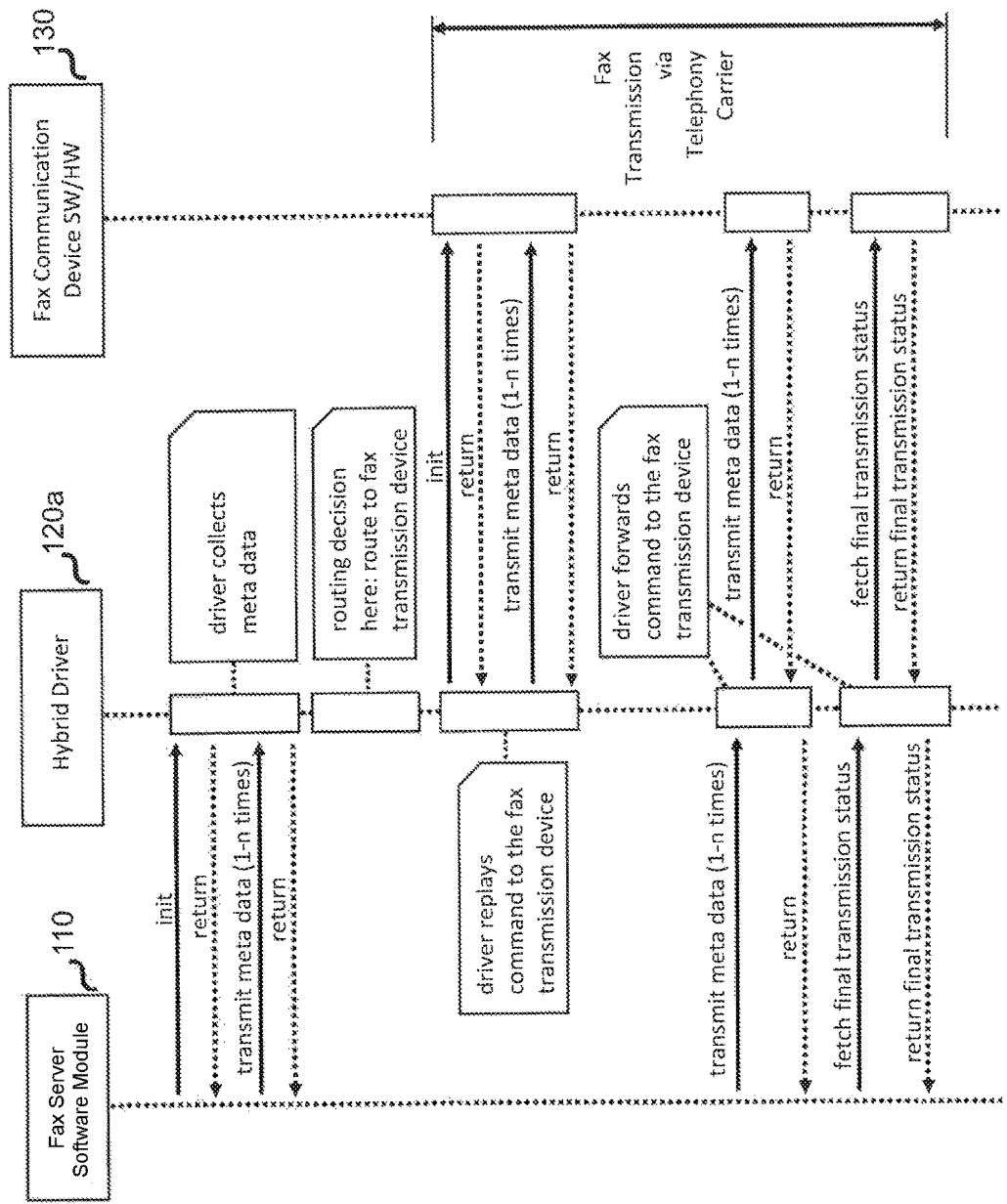
FIGS. 5a-5c are data flow diagrams illustrating fax data communication according to the invention.
Figure 5B:
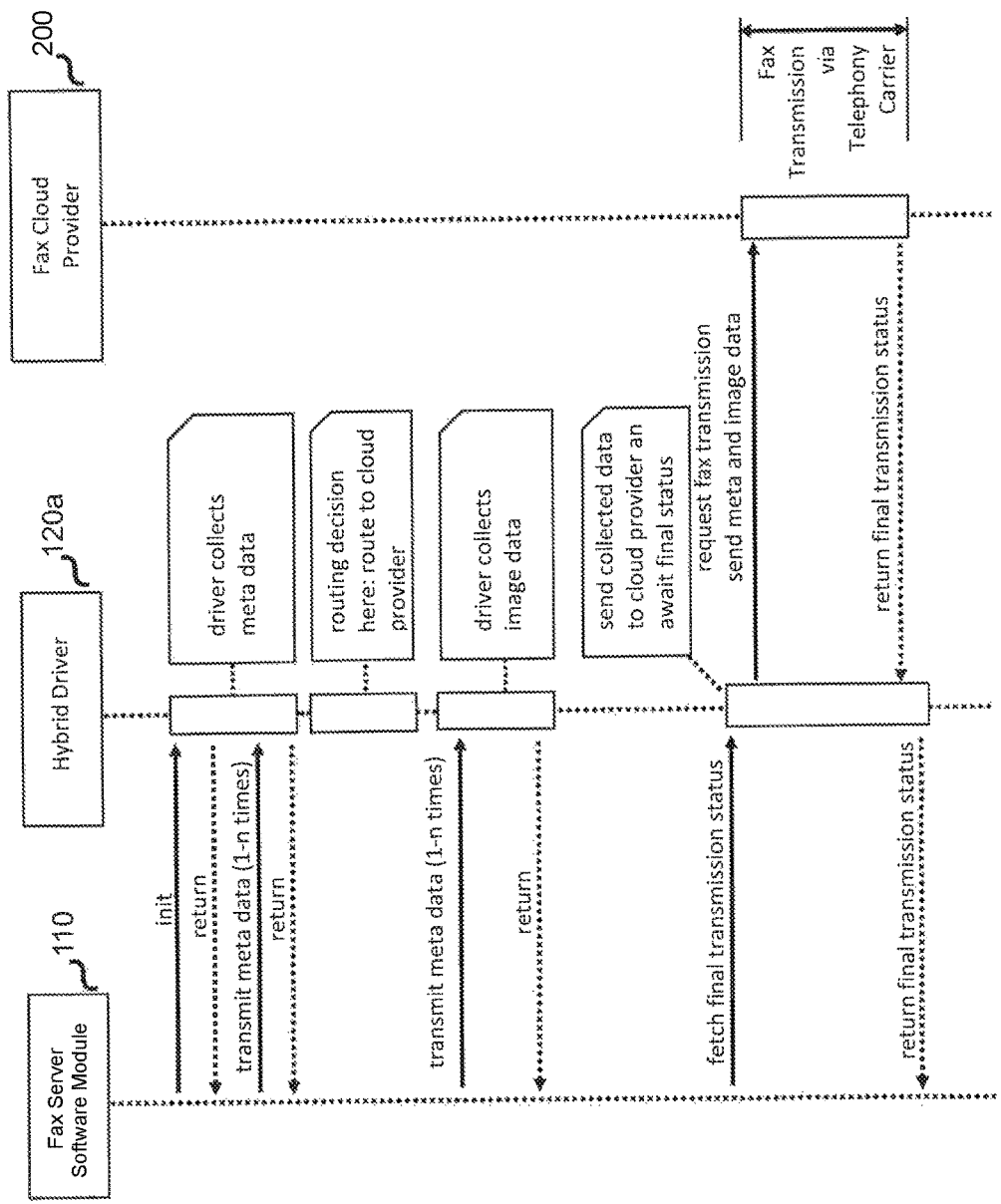
Figure 5C:
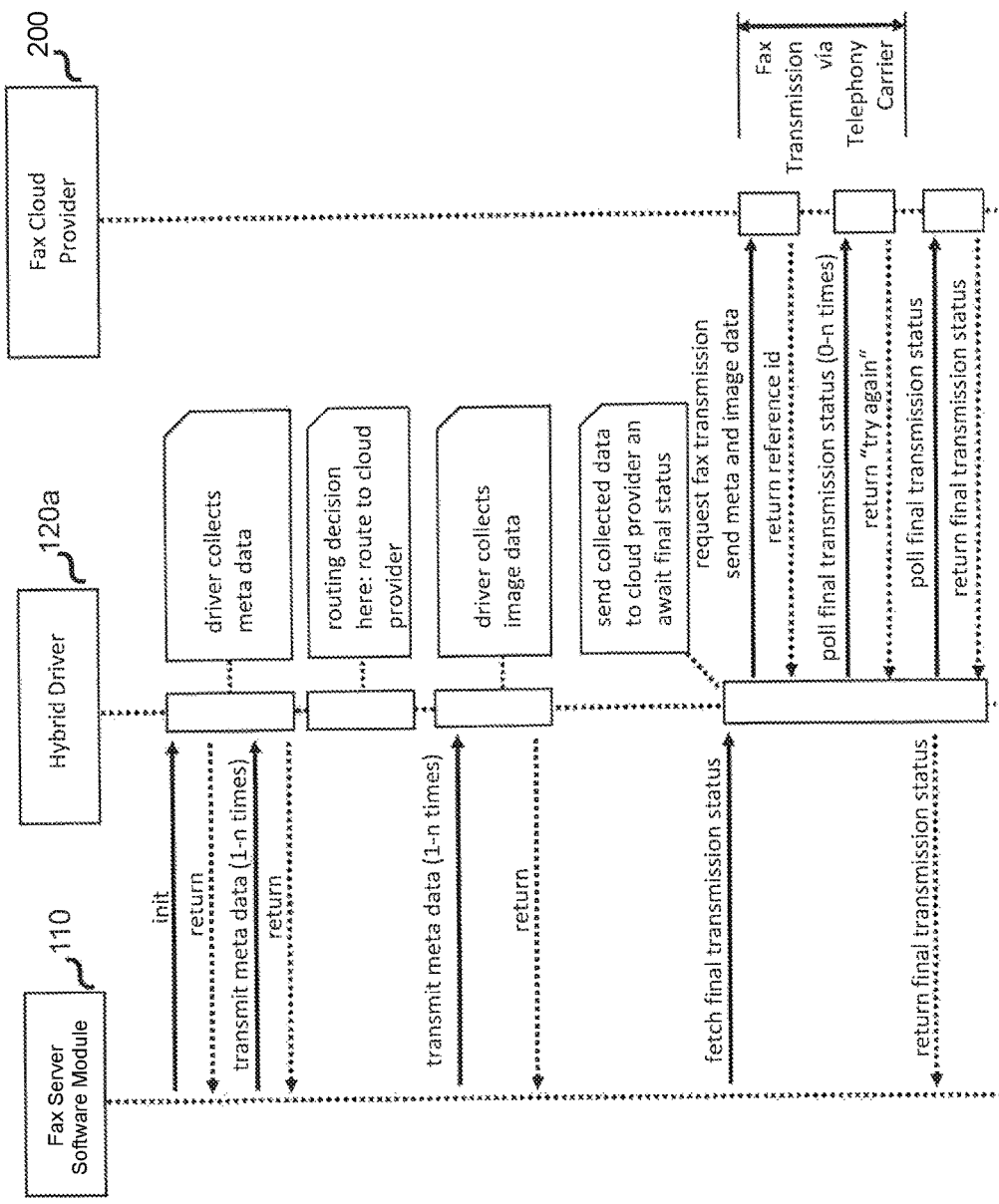

With reference to FIGS. 5*a* to 5*c* the operation of the hybrid fax hardware driver 120*a* is further described.

FIG. 5*a* exemplarily illustrates the operation mode of the hybrid fax communication device driver 120*a* (in FIG. 5 shortly denoted as "hybrid driver") when a fax message is transmitted via the local fax communication device 130 to the fax message receiving device 42. FIG. 5*a* illustrates the communication steps between hybrid fax communication device driver 120*a* and fax server software module 110 on the one hand, and between hybrid fax communication device driver 120 and fax communication device 130 on the other hand.

The communication starts with an initialization (INIT command in FIG. 5*a*) of the hybrid fax communication device driver 120*a* by the fax server software module 110. The hybrid fax communication device driver 120*a* acknowledges the initialization with a return message. Thereafter the fax server software module 110 transmits the metadata of a fax message to be transmitted. The driver 120*a* acknowledges the reception of the metadata and collects the metadata.

Based on the received metadata, the hybrid fax communication device driver 120*a* decides whether to route the fax message to the local transmission device 130 or to the fax cloud provider 200. In the present case the metadata are such that a comparison of the metadata with one or more predefined routing rules results in a decision to route the fax message to the fax communication device 130. At least one of the routing rules described above in conjunction with FIG. 4 is used for the decision.

Following the routing decision, the hybrid fax communication device driver 120*a* starts communication with the local fax communication device 130 by initializing the local fax communication device 130 (INIT command). The local fax communication device 130 acknowledges the initialization with a return message. Thereafter, the hybrid fax communication device driver 120*a* starts routing the metadata received from the fax server software module 110 to the fax communication device 130. The fax communication device 130 acknowledges the reception of the metadata by a return message. Moreover the fax communication device 130 starts with establishing a connection to the fax message receiving device 42 based on the received fax metadata.

In a subsequent step the hybrid fax communication device driver 120*a* receives image data of the fax message from the fax server software module 110. The image data already represent the content data of the fax message in an appropriate fax format. The hybrid fax communication device driver 120*a* routes the received image data to the fax communication device 130. The fax communication device 130, in turn, acknowledges reception of the image data by a return message. Further, the fax communication device 130 starts transmitting the image data over the established connection via the telephone network 1000 to the fax message receiving device 42.

The communication between the fax server software module 110 and the fax communication device 130 terminates with receiving a final transmission status from the fax communication device 130 indicating that the fax message transmission to the message receiving device 42 was successful or aborted. For this purpose, the hybrid fax communication device driver 120*a* routes a final transmission status request received from the fax server software module 110 (see "fetching final transmission status" in FIG. 5*a*) to the fax communication device 130. The fax communication device 130 returns the final transmission status to the hybrid fax communication device driver 120*a*, which, in turn, forwards the received final transmission status to the fax server software module 110.

As derivable from FIG. 5*a*, the hybrid fax communication device driver 120*a* mainly acts as gateway for the communication between the fax server software module 110 on the one hand and the fax communication device 130 on the other hand.

With reference to FIG. 5*b* an exemplary operation of the hybrid driver 120 is discussed when a fax message is transmitted via the remote fax cloud provider 200 to the fax message receiving device 42. Again the operation is illustrated in form of a diagram illustrating the communication flow between the fax server software module 110 and the hybrid fax communication device driver 120*a* on the one hand, and between the hybrid fax communication device driver 120*a* and the remote cloud provider 200 on the other hand.

The communication between the fax server software module 110 and the hybrid fax communication device driver 120a corresponds to the communication between the fax server software module 110 and the hybrid fax communication device driver 120a in the operation mode shown in FIG. 5a. That is, the communication between the fax server software module 110 and the hybrid fax communication device driver 120a is the same, regardless of whether the fax message is routed to the local fax communication device 130 or to the remote fax cloud provider 200.

The communication starts with initialization of the hybrid fax communication device driver 120a by the fax server software module 110 and the collection of metadata transmitted from the fax server software module 110 to the hybrid fax communication device driver 120a, as described in conjunction with FIG. 5a above.

In contrast to the operation mode shown in FIG. 5a, the hybrid fax communication device driver 120a now decides, on the basis of received metadata associated with the fax message and predetermined routing rules, to route the fax message to the cloud fax provider 200. Following the routing decision the hybrid fax communication device driver 120a collects image data associated with the fax message and received from the fax server software module 110. Thereafter, the hybrid fax communication device driver 120a establishes a connection and starts to send the fax data (that is, metadata and image data in form of IP-data packages) over the TCP/IP-network 2000 to the cloud provider 200. For instance, it is conceivable that the fax data are uploaded to the cloud fax provider 200 by using a HTTP put.

Thereafter, the hybrid fax communication device driver 120a waits for a final transmission status return from the cloud fax provider 200 and returns the final transmission status to the fax server software module 110. As illustrated in FIG. 5b, the established connection between hybrid fax communication device driver 120a and cloud fax provider 200 remains open until the final transmission status has been received. This way of transmission is called synchronous fax message transmission. The described synchronous fax message transmission is very efficient for short fax messages (that is, fax messages comprising only a few pages). However, for long fax messages the synchronous message transmission may unduly consume transmission resources and cause timeout problems.

For long faxes, an asynchronous fax transmission can be provided, which is illustrated in FIG. 5c and discussed in the following. The fax transmission in FIG. 5c substantially corresponds to the transmission of FIG. 5b discussed above. The only difference lies in the fact that the hybrid fax communication device driver 120a does not keep open the connection to the cloud fax provider 200 until the final transmission status has been received. Rather, the hybrid fax communication device driver 120a uses a reference ID returned by the cloud provider 200 in response to the fax transmission request and uses this reference ID for polling the final transmission status. The polling can be repeated several times (for instance 0–n times with n being a predetermined integer) until a final transmission status is returned by the fax cloud provider 200 or a timeout limit has been reached. Upon receiving the final transmission status, the hybrid fax communication device driver 120a returns the final transmission status to the fax server software module 110. This asynchronous message transmission is advantageous for long fax messages requiring a time-consuming fax transmission. The hybrid fax communication device driver 120a may be designed to decide whether to use the synchronous or asynchronous fax transmission mode in dependence of the fax length.

As discussed above, the provided fax transmission technique is implemented on hardware driver level of a local fax server. The technique can be easily implemented in a conventional fax server by simply replacing a conventional fax communication device driver with the hybrid driver of the present invention. All other server components (i.e., server fax hardware and server fax software) can be retained. Therefore the claimed invention provides a very cost-efficient fax messaging solution capable of combining the advantageous of both fax messaging approaches, i.e., messaging over a local fax server and a cloud fax provider. Further, since the present technique provides two different messaging paths, the fax transmission load can be better distributed. Still further, a messaging backup system can be realized using the two different messaging paths. In case of interruption of one of the two messaging paths, the other one can still be used for fax messaging.

While the technique presented herein has been described with respect to particular embodiments, those skilled in the art will recognize that the present invention is not limited to the specific embodiments described and illustrated herein. It is to be understood that the disclosure is only illustrative. Accordingly, it is intended that the present invention be limited only by the scope of the claims appended hereto.

The invention claimed is:

1. A method of transmitting fax messages from at least one fax message sending device to at least one fax message receiving device, the method being implemented in a hybrid fax communication device driver being configured to be in communication with a fax communication device of a fax server and a cloud fax provider arranged remote from the fax server on the one hand, and a fax server software module on the other hand, the method comprising the steps of:

receiving, from the fax server software module, fax data associated with a fax message to be transmitted from a fax message sending device to a fax message receiving device, wherein the fax data comprises fax metadata and fax image data;

comparing at least one fax data parameter derivable from the fax metadata with at least one predetermined routing rule which defines routing conditions under which fax messages are to be transmitted;

based on the comparison result, deciding whether to route the fax data to the fax communication device or to the cloud fax provider; and based on the decision result, selectively routing the fax data to the fax communication device or to the cloud fax provider for transmission to the fax message receiving device, wherein an established connection between the cloud fax provider and the hybrid fax communication device driver is closed after the fax data has been routed to the cloud fax provider, and wherein the method further comprises:

polling the final transmission status until the final transmission status is returned from the cloud fax provider or a connection timeout is reached.

2. The method according to claim 1, wherein the at least one predetermined routing rule defines whether to route the fax data to the cloud fax provider or to the fax communication device based on at least one fax data parameter and/or fax transmission parameter.

3. The method according to claim 1, wherein the at least one fax data parameter comprises at least one of the following parameters derivable from fax metadata: sending device identifier, receiving device identifier, fax number of the message receiving device, fax number of the message sending device, priority level of a fax message to be transmitted, security level of a fax message to be transmitted, and at least one processing parameter indicative of a processing type of the fax message to be transmitted.

4. The method according to claim 2, wherein the fax transmission parameter is indicative of the current transmission load of the fax communication device.

5. The method according to claim 1, wherein the deciding step comprises: deciding on the basis of a fax number and/or identifier of the fax message sending device whether to transmit the fax message to the fax communication device or to the cloud fax provider.

6. The method according to claim 1, wherein the routing step comprises:
   establishing a connection with the fax communication device and routing the fax image data to the fax communication device, if it has been decided to transmit the fax message via the fax communication device to the message receiving device.

7. The method according to claim 1, wherein the routing step comprises:
   establishing a connection with the cloud fax provider and routing the fax data to the cloud fax provider, if it has been decided to transmit the fax message via the cloud fax provider to the message receiving device.

8. The method according to claim 1, further comprising:
   receiving a final transmission status from the fax communication device or cloud fax provider after the fax message has been transmitted to the message receiving device; and
   returning the final transmission status to the fax server software module.

9. The method according to claim 8, wherein an established connection between the cloud fax provider and the hybrid fax communication device driver is kept open until the final transmission status has been received from the cloud fax provider.

10. The method according to claim 9, wherein a decision to keep open or close a connection to the cloud fax provider is based on a length of the fax message to be sent.

11. A hybrid fax communication device driver deployed on a fax server, wherein the hybrid fax communication device driver is configured to be in communication with a fax communication device of the fax server and a cloud fax provider arranged remote from the fax server on the one hand, and a fax server software module on the other hand, wherein the hybrid fax communication device driver is further configured to:
   receive, from the fax server software module, fax data associated with a fax message to be transmitted from the fax message sending device to the fax message receiving device, wherein the fax data comprises fax metadata and fax image data;
   compare at least one fax data parameter derivable from the fax metadata with at least one predetermined routing rule, wherein the at least one predetermined routing rule defines whether to route the fax data to the cloud fax provider or to the fax communication device based on the at least one fax data parameter;
   based on the comparison result, decide whether to route the fax data to the fax communication device or to the cloud fax provider; and
   based on the decision result, selectively route the fax data to the fax communication device or to the cloud fax provider,
   wherein an established connection between the cloud fax provider and the hybrid fax communication device driver is closed after the fax data has been routed to the cloud fax provider, and wherein the hybrid fax communication device driver is further configured to:
   poll the final transmission status until the final transmission status is returned from the cloud fax provider or a connection timeout is reached.

12. A fax server for transmitting fax messages from at least one fax message sending device to at least one fax message receiving device, the fax server being in communication with the at least one fax message sending device over a local area network, comprising:
   a fax server software module configured to generate fax data based on document data to be transmitted as fax message;
   a fax communication device; and
   the hybrid fax communication device driver according to claim 11, wherein the fax communication device is configured to transmit the fax data received from the hybrid fax communication device driver to the message receiving device.

* * * * *